US010984793B2

(12) United States Patent
Lu (10) Patent No.: US 10,984,793 B2
(45) Date of Patent: Apr. 20, 2021

(54) VOICE INTERACTION METHOD AND DEVICE

(71) Applicant: BAIDU ONLINE NETWORK TECHNOLOGY (BEIJING) CO., LTD., Beijing (CN)

(72) Inventor: Yongshuai Lu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 184 days.

(21) Appl. No.: 16/278,676

(22) Filed: Feb. 18, 2019

(65) Prior Publication Data

US 2020/0005780 A1 Jan. 2, 2020

(30) Foreign Application Priority Data

Jun. 27, 2018 (CN) .......................... 201810685005.0

(51) Int. Cl.
*G10L 15/22* (2006.01)
*G06F 16/242* (2019.01)
*G10L 15/04* (2013.01)

(52) U.S. Cl.
CPC ............ *G10L 15/22* (2013.01); *G06F 16/243* (2019.01); *G10L 15/04* (2013.01); *G10L 2015/223* (2013.01)

(58) Field of Classification Search
CPC .......... G06F 17/28; G06F 17/30; G06F 17/27; G06F 16/243; G06N 3/08; G10L 15/22; G10L 15/04; G10L 2015/223
See application file for complete search history.

(56) References Cited

U.S. PATENT DOCUMENTS

| 10,216,834 | B2 * | 2/2019 | Bull ...................... G06F 16/338 |
| 2007/0022109 | A1 * | 1/2007 | Imielinski ........... G06F 16/3329 |
| 2010/0191686 | A1 * | 7/2010 | Wang ...................... G06F 16/33 |
| | | | 706/46 |
| 2014/0270145 | A1 * | 9/2014 | Erhart ................. H04M 3/5166 |
| | | | 379/265.13 |

(Continued)

FOREIGN PATENT DOCUMENTS

| CN | 103810218 A | 5/2014 |
| CN | 105095444 A | 11/2015 |

(Continued)

OTHER PUBLICATIONS

The Chinese First Examination Report of corresponding Chinese application No. 201810685005.0, dated Apr. 18, 2019.

(Continued)

*Primary Examiner* — Michael Colucci
(74) *Attorney, Agent, or Firm* — J.C. Patents (57) ABSTRACT

Embodiments of the present disclosure provide voice interaction method and device. The method includes: determining whether a first query statement currently received is a query statement first received within a preset time period; if not, obtaining a second query statement, where the second query statement is a query statement lastly received before receiving the first query statement; obtaining a third sentence vector according to a first sentence vector of the first query statement and a second sentence vector of the second query statement; and obtaining, from a bottom corpus, a first question and answer result corresponding to a fourth sentence vector a similarity between which and the third sentence vector satisfies a preset condition, and returning the first question and answer result. The method provided in the embodiment can return a bottom reply irrelevant to the query statement to the user, thereby improving the user experience.

20 Claims, 5 Drawing Sheets

(56) References Cited

U.S. PATENT DOCUMENTS

| | | | | |
|---|---|---|---|---|
| 2014/0358894 | A1* | 12/2014 | Wei | G06F 16/2453 |
| | | | | 707/713 |
| 2015/0269142 | A1* | 9/2015 | Antebi | G06F 40/35 |
| | | | | 704/9 |
| 2016/0357418 | A1* | 12/2016 | Rosenberg | H04L 67/14 |
| 2018/0204184 | A1* | 7/2018 | Rosenberg | G06Q 10/103 |
| 2018/0308107 | A1* | 10/2018 | Deng | G06K 9/00288 |
| 2018/0373791 | A1* | 12/2018 | Yen | G09B 7/08 |
| 2019/0286086 | A1* | 9/2019 | Gardner | G05B 17/02 |
| 2019/0385060 | A1* | 12/2019 | Carmeli | G06N 3/084 |

FOREIGN PATENT DOCUMENTS

| | | |
|---|---|---|
| CN | 106095834 A | 11/2016 |
| CN | 106484664 A | 3/2017 |
| CN | 107153639 A | 9/2017 |
| CN | 107193978 A | 9/2017 |
| CN | 107329967 A | 11/2017 |
| CN | 107729322 A | 2/2018 |
| CN | 108170749 A | 6/2018 |
| JP | 2004-192491 A | 7/2004 |
| JP | 2008-129692 A | 6/2008 |
| JP | 2018-055548 A | 4/2018 |

OTHER PUBLICATIONS

The Japanese Notice of Allowance of corresponding Japanese application No. 2019-048952, dated Feb. 2, 2020.

The Chinese Notification of Allowance of corresponding Chinese application No. 201810685005.0, dated Jul. 9, 2019.

* cited by examiner

VOICE INTERACTION METHOD AND DEVICE

CROSS-REFERENCE TO RELATED APPLICATION

This application claims priority to Chinese Patent Application No. 201810685005.0, filed on Jun. 27, 2018, which is hereby incorporated by reference in its entirety.

TECHNICAL FIELD

Embodiments of the present disclosure relate to the field of voice interaction technologies and, in particular, to a voice interaction method and a device.

BACKGROUND

With the continuous advancement of artificial intelligence technology, human-machine voice interaction has also made great progress, and various voice assistants and human-computer interaction devices are favored by more and more users.

In an existing voice interaction process, after the user inputs a query statement to a machine, the machine searches for a question and answer result matching the query statement in a corpus, and then feeds the question and answer result to the user. However, because the number of Q&A pairs stored in the corpus is limited, the user's query statement cannot get a corresponding question and answer result. Therefore, the machine needs to use the so-called "bottom word" to return. "Bottom word" refers to setting a bottom word set, the set stores a small number of fixed reply statements therein, and a reply sentence can be randomly selected from the bottom word set to reply. For example, the bottom word set can include "I don't understand", "I don't catch on", "Seeking information and studying", "You get me sad there", or the like.

However, a bottom reply is to randomly select a reply sentence from the bottom word set to reply, which causes the reply to be irrelevant to the user's query statement, thereby causing the user experience to be poor.

SUMMARY

The embodiment of the present disclosure provides a voice interaction method and a device, so as to overcome the problem that the reply content is irrelevant to the user's query statement and the user experience is poor.

In a first aspect, an embodiment of the present disclosure provides a voice interaction method, including:

determining whether a first query statement currently received is a query statement first received within a preset time period;

if not, obtaining a second query statement, where the second query statement is a query statement lastly received before receiving the first query statement;

obtaining a third sentence vector according to a first sentence vector of the first query statement and a second sentence vector of the second query statement; and obtaining, from a bottom corpus, a first question and answer result corresponding to a fourth sentence vector a similarity between which and the third sentence vector satisfies a preset condition, and returning the first question and answer result.

In a possible design, the obtaining the third sentence vector according to the first sentence vector of the first query statement and the second sentence vector of the second query statement includes:

performing an addition process on the first sentence vector of the first query statement and the second sentence vector of the second query statement to obtain the third sentence vector.

In a possible design, before the obtaining the third sentence vector according to the first sentence vector of the first query statement and the second sentence vector of the second query statement, the method further includes:

performing a word segmentation process on the first query statement to obtain a plurality of first words, and performing a word segmentation process on the second query statement to obtain a plurality of second words; and obtaining the first sentence vector of the first query statement according to word vectors of the plurality of the first words, and obtaining the second sentence vector of the second query statement according to word vectors of the plurality of the second words.

In a possible design, the obtaining, from the bottom corpus, the first question and answer result corresponding to the fourth sentence vector the similarity between which and the third sentence vector satisfies the preset condition includes:

obtaining a similarity between each fifth sentence vector in the bottom corpus and the third sentence vector, where the bottom corpus includes a first question and answer pair, and a fifth sentence vector corresponding to a third query statement in the first question and answer pair;

taking the fifth sentence vector having a highest similarity with the third sentence vector as the fourth sentence vector; and obtaining, from the bottom corpus, the first question and answer result corresponding to the fourth sentence vector.

In a possible design, the obtaining the similarity between each fifth sentence vector in the bottom corpus and the third sentence vector includes:

obtaining a cosine similarity between each fifth sentence vector in the bottom corpus and the third sentence vector.

In a possible design, before the obtaining the similarity between each fifth sentence vector in the bottom corpus and the third sentence vector, the method further includes:

obtaining a chat closed set from a network, and obtaining the first question and answer pair according to the chat closed set; and obtaining the bottom corpus according to the first question and answer pair.

In a possible design, before the determining whether the first query statement currently received is the query statement first received within the preset time period, the method further includes:

determining whether there is a second question and answer pair corresponding to the first query statement in a question and answer corpus, and an obtained determining result is no.

In a possible design, if the first query statement is the query statement first received within the preset time period, the method further includes:

obtaining, according to the first sentence vector of the first query statement and from the bottom corpus, a second question and answer result corresponding to a sixth sentence vector a similarity between which and the first sentence vector similarity satisfies the preset condition, and returning the second question and answer result.

In a second aspect, an embodiment of the present disclosure provides a voice interaction device, including:

a determining module, configured to determine whether a first query statement currently received is a query statement first received within a preset time period;

a statement obtaining module, configured to: when a determining result of the determining module is no, obtain a second query statement, where the second query statement is a query statement lastly received before receiving the first query statement;

a processing module, configured to obtain a third sentence vector according to a first sentence vector of the first query statement and a second sentence vector of the second query statement; and a result obtaining module, configured to obtain, from a bottom corpus, a first question and answer result corresponding to a fourth sentence vector a similarity between which and the third sentence vector satisfies a preset condition, and return the first question and answer result.

In one possible design, the processing module is specifically configured to:

perform an addition process on the first sentence vector of the first query statement and the second sentence vector of the second query statement to obtain the third sentence vector.

In a possible design, the device further includes: a vector obtaining module;

the vector obtaining module is further configured to: before the third sentence vector is obtained according to the first sentence vector of the first query statement and the second sentence vector of the second query statement, perform a word segmentation process on the first query statement to obtain a plurality of first words, and perform a word segmentation process on the second query statement to obtain a plurality of second words;

obtain the first sentence vector of the first query statement according to word vectors of the plurality of first words, and obtain the second sentence vector of the second query statement according to word vectors of the plurality of second words.

In one possible design, the result obtaining module is specifically configured to:

obtain a similarity between each fifth sentence vector in the bottom corpus and the third sentence vector, where the bottom corpus includes a first question and answer pair, and a fifth sentence vector corresponding to a third query statement in the first question and answer pair;

take the fifth sentence vector having a highest similarity with the third sentence vector as the fourth sentence vector; and obtain, from the bottom corpus, the first question and answer result corresponding to the fourth sentence vector.

In a possible design, the result obtaining module is further specifically configured to:

obtain a cosine similarity between each fifth sentence vector in the bottom corpus and the third sentence vector.

In a possible design, the method further includes: a corpus obtaining module;

the corpus obtaining module is configured to: before the similarity between each fifth sentence vector in the bottom corpus and the third sentence vector is obtained, obtain a chat closed set from a network, and obtain the first question and answer pair according to the chat closed set; and obtain the bottom corpus according to the first question and answer pair.

In a possible design, the determining module is further configured to: before whether the first query statement currently received is the query statement first received within the preset time period is determined, determine whether there is a second question and answer pair corresponding to the first query statement in a question and answer corpus, and an obtained determining result is no.

In a possible design, the result obtaining module is further configured to: if the first query statement is the query statement first received within the preset time period, obtain, according to the first sentence vector of the first query statement and from the bottom corpus, a second question and answer result corresponding to a sixth sentence vector a similarity between which and the first sentence vector similarity satisfies the preset condition, and return the second question and answer result.

In a third aspect, an embodiment of the present disclosure provides a voice interaction device, including: at least one processor and a memory;

the memory stores a computer-executed instruction;

the at least one processor executes the computer-executed instruction stored by the memory to execute the voice interaction method as described in the first aspect and the various possible designs of the first aspect.

In a fourth aspect, an embodiment of the present disclosure provides a computer readable storage medium, where the computer readable storage medium stores a computer-executed instruction therein, and when a processor executes the computer-executed instruction, the processor implements the voice interaction method as described in the first aspect and the various possible designs of the first aspect.

The embodiments provide voice interaction method and device. The method includes determining whether a first query statement currently received is a query statement first received within a preset time period; if not, obtaining a second query statement, where the second query statement is a query statement lastly received before receiving the first query statement; and obtaining a third sentence vector according to a first sentence vector of the first query statement and a second sentence vector of the second query statement. In the embodiment, the sentence vector is obtained by combining the previous query statement, which fully considers the user's conversation scene, so that the question and answer result can consider context information. The method further includes obtaining, from a bottom corpus, a first question and answer result corresponding to a fourth sentence vector a similarity between which and the third sentence vector satisfies a preset condition, and returning the first question and answer result, so that a calculation process is simple, and the question and answer result can be obtained quickly and accurately.

BRIEF DESCRIPTION OF THE DRAWINGS

In order to more clearly illustrate technical solutions of the embodiments of the present disclosure or in the prior art, a brief description of the drawings used in the embodiments or the prior art description will be described below. Obviously, the drawings in the following description are some of the embodiments of the present disclosure, and other drawings can be obtained from those skilled in the art according to the drawings without any inventive labor.

DETAILED DESCRIPTION OF THE EMBODIMENTS

In order to make objectives, technical solutions and advantages of embodiments of the present disclosure clearer, the technical solutions in the embodiments of the present disclosure will be described hereunder clearly and completely with reference to accompanying drawings of the embodiments of the present disclosure. Obviously, the described embodiments are only a part of embodiments of the present disclosure, rather than all of them. All other embodiments derived by those skilled in the art based on the embodiments of the present disclosure without making any creative effort shall fall within the scope of the present disclosure.

Figure 1:
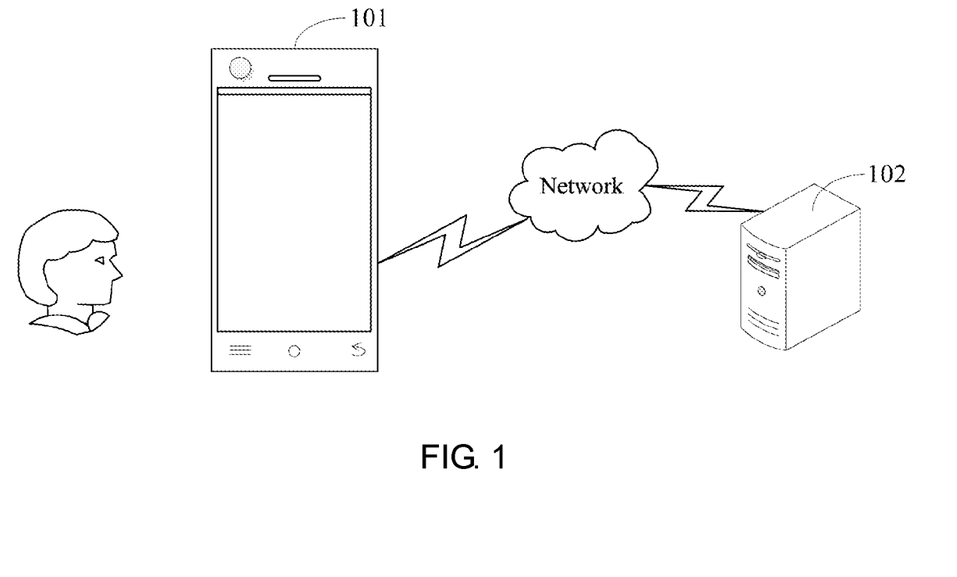
FIG. 1 is a schematic architecture diagram of a system for determining a satisfaction degree of voice interaction according to an embodiment of the present disclosure.

FIG. 1 is a schematic architecture diagram of a system for determining a satisfaction degree of voice interaction according to an embodiment of the present disclosure. As shown in FIG. 1, the system provided in the embodiment includes a terminal 101 and a server 102. The terminal 101 may be a children story machine, a mobile phone, a tablet, an in-vehicle terminal, or the like. The implementation manner of the terminal 101 is not particularly limited in this embodiment as long as the terminal 101 can perform voice interaction with a user.

Voice interaction is based on technologies such as voice recognition, voice synthesis, natural language understanding, or the like. In multiple practical application scenarios, the terminal is given an intelligent human-computer interaction experience of "listening, speaking, and understanding". It is applicable to multiple application scenarios, including scenarios such as smart question and answer, smart play, smart search, or the like.

The user inputs an inquiry sentence to the terminal 101 by voice, and the terminal 101 may obtain a question and answer result according to the inquiry statement and feed back to the user. Specifically, the terminal 101 may obtain the question and answer result locally according to a corpus stored by itself, or may send the query to the server 102, which obtains the question and answer result, and feeds back to the terminal 101. In this embodiment, the specific implementation manner is not particularly limited, as long as the terminal 101 locally obtains the question and answer result and the server 102 obtains the question and answer result according to the query statement.

However, in some scenarios, since the terminal 101 cannot obtain the corresponding question and answer result, and provides a bottom reply to the user. However, the bottom reply is irrelevant to the user's query statement, thereby causing the user experience to be poor. In order to solve the technical problem, the embodiment provides a voice interaction method, which obtains a question and answer result based on a similarity of sentence vectors, thereby improving the similarity between the question and answer result and the query statement, and improving the user experience. Detailed description will be made below using detailed embodiments.

Figure 2:
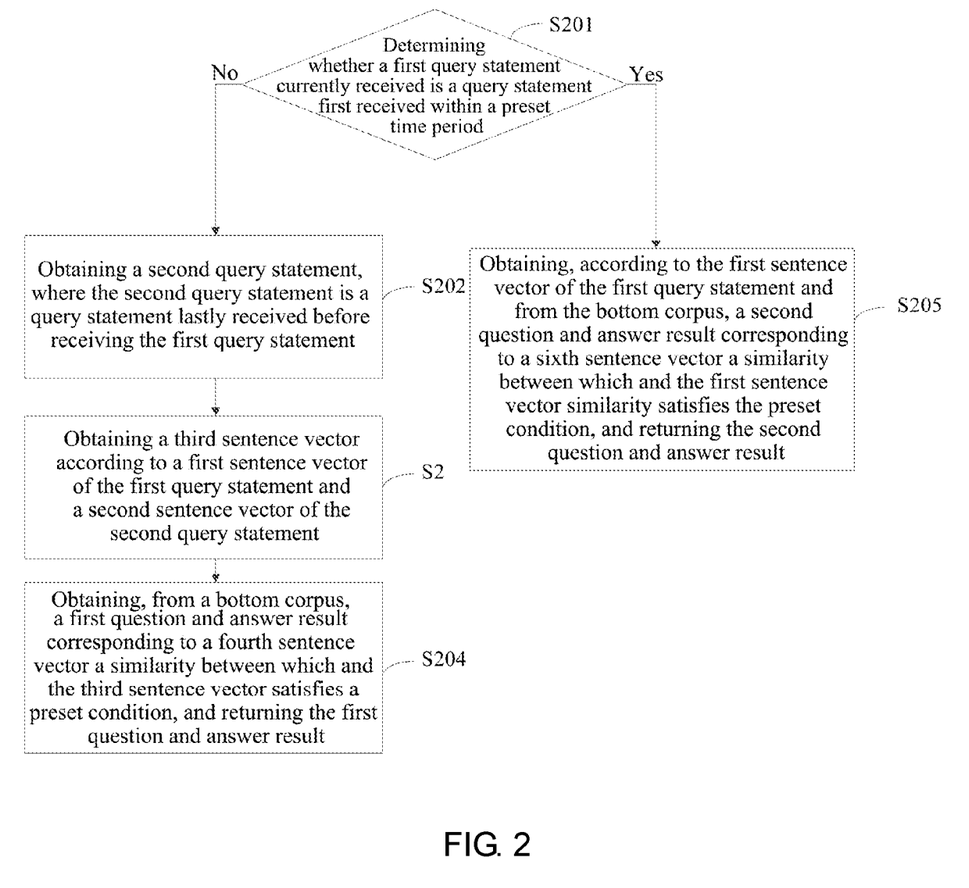
FIG. 2 is a first schematic flowchart of a voice interaction method according to an embodiment of the present disclosure.

FIG. 2 is a first schematic flowchart of a voice interaction method according to an embodiment of the present disclosure. An execution body of the embodiment may be the terminal in the embodiment shown in FIG. 1 or the server in the embodiment shown in FIG. 1, which is not specifically limited in this embodiment. As shown in FIG. 2, the method includes:

S201: determining whether a first query statement currently received is a query statement first received within a preset time period; if not, performing S202, and if yes, performing S205.

S202: obtaining a second query statement, where the second query statement is a query statement lastly received before receiving the first query statement;

S203: obtaining a third sentence vector according to a first sentence vector of the first query statement and a second sentence vector of the second query statement.

After the user inputs the voice, that is, after the first query inputted by the user is obtained, it is determined whether the first query is a first sentence of the current session. It can be understood by those skilled in the art that the first query statement may be a voice or a text inputted by the user, which is not specifically limited in this embodiment.

If the first query inputted by the user is not the first sentence of the session, but a second sentence of the current session or later, a multi-round matching output algorithm is adopted. Specifically, a session time may be understood as a preset time period. For example, a time period of 10 minutes can be used. If the user has said other query statements within 10 minutes, the current first query statement uses multi-round matching manner to carry out a bottom reply.

For example, the user's first query statement is "Good evening", the answer is "Good evening, I am very happy to see you", and then the user says "It is snowing today". Then, the following sentence "It is snowing today" uses the following multi-round matching algorithm for a bottom word output.

In the multi-round matching, it is also necessary to obtain the second query statement, the second query statement is a query statement lastly received before receiving the first query statement (a previous query statement of the first query statement). When matching with a bottom corpus, the third sentence vector is obtained according to the first sentence vector of the first query statement and the second sentence vector of the second query statement.

Specifically, the first sentence vector and the second sentence vector may be obtained in various manners. The embodiment is described in detail by taking a specific embodiment as an example. With respect to other implementations, this embodiment does not specifically limit thereto.

In a specific implementation process, a word segmentation process is performed on the first query statement to obtain a plurality of first words, and a word segmentation process is performed on the second query statement to obtain a plurality of second words; and the first sentence vector of the first query statement is obtained according to word vectors of the plurality of first words, and the second sentence vector of the second query statement is obtained according to word vectors of the plurality of second words.

The so-called word vector is a vector representation of the word, that is, a word can correspond to a vector. For similar words, the corresponding word vectors are similar. For example, a word vector of "rain" is (0.5, 0.5), and a word vector of "snowing" is (0.6, 0.6). In the embodiment, the word vector of two-dimensional is taken as an example for calculation, which is just to illustrate the flow of the whole disclosure, the word vector in actual project may be a word vector with more dimension, such as 1024 dimensions, and the calculation process and the amount of data will be more complicated, but the overall idea is consistent.

There are many mature algorithms for word vector calculation, such as statistical language model, neural network probabilistic language model, deep learning model, or the like, as long as there is a large amount of text corpus to train the appropriate word vector. The present disclosure does not limit the construction method of the word vector.

Since the first query statement and the second query statement are both sentences, rather than words. If the sentence vector is to be obtained according to the word vector, a word segmentation process is required to perform on the first query statement and the second query statement. For example, if the user input is "It is snowing today", then a word segmentation is "today", "snowing", "It is"; according to the above word vectors, the word vector of "today" can be obtained as (0.5, 0), the word vector of "snowing" is (0.6, 0.6), and the word vector if "It is" is (0, 0.1). Then, the sentence vector of the user's input "It is snowing today" is (0.5+0.6+0, 0+0.6+0.1), that is, (1.1, 0.7).

After obtaining the first sentence vector of the first query statement and the second sentence vector of the second query statement, the third sentence vector is obtained according to the first sentence vector and the second sentence vector. Specifically, the first sentence vector and the second sentence vector may be summed or weighted averaged to obtain the third sentence vector.

For example, the user's query statement "It is snowing today" (a previous sentence of which is "Good evening"), that is, the first query statement is "It is snowing today" and the second query statement is "Good evening".

As can be seen from the above, the first sentence vector corresponding to "It is snowing today" is (1.1, 0.7). For the second query statement "Good evening", the word vector of "evening" is (−0.7, 1), the word vector of "Good" is (−0.1, 0.2), and the second sentence vector corresponding to "Good evening" is (−0.8, 1.2), which is added to the sentence vector (1.1, 0.7) of "It is snowing today" to obtain a new sentence vector of (0.3, 1.9), i.e., the third sentence vector.

S204: obtaining, from the bottom corpus, a first question and answer result corresponding to a fourth sentence vector a similarity between which and the third sentence vector satisfies a preset condition, and returning the first question and answer result.

In the embodiment, the bottom corpus includes a first question and answer pair, and a fifth sentence vector corresponding to a third query statement in the first question and answer pair. The first question and answer pair includes an inquiry statement and a corresponding question and answer result, and for each inquiry sentence, the fifth sentence vector of the inquiry sentence is calculated and obtained.

Specifically, a similarity between each fifth sentence vector in the bottom corpus and the third sentence vector is obtained, the fifth sentence vector having a highest similarity with the third sentence vector is taken as the fourth sentence vector, and the first question and answer result corresponding to the fourth sentence vector is obtained from the bottom corpus.

For example, it is supposed that the bottom corpus includes the query statement "It is raining today" and "It is raining this evening".

The sentence vector of "Today/raining/It is" is (0.5+0.5+0, 0+0.5+0.1), that is, (1, 0.6). The corresponding sentence vector of "this/evening/raining/It is" is (0.5−0.7+0.5+0, 0+1+0.5+0.1)=(0.3, 1.6).

The similarity between the above two sentence vectors and the third sentence vector is calculated. There are various ways to calculate the similarity. A cosine similarity is taken as an example for illustration herein.

That is, $$\cos\theta = \frac{a \square b}{\|a\|\|b\|},$$

where $\cos\theta$ is the cosine similarity, a and b are respectively sentence vectors.

The third sentence vector is the sentence vector obtained from "Good evening+It is snowing today" is taken as an example for description in detail.

The cosine similarity of "Good evening+It is snowing today" (which is set as a (0.3, 1.9)) and "It is raining today" (which is set as b (1, 0.6)) is:

$$\cos\theta_1 = \frac{a \square b}{\|a\|\|b\|} = \frac{0.3 \times 1 + 1.9 \times 0.6}{\sqrt{0.3^2 + 1.9^2} + \sqrt{1^2 + 0.6^2}} = 0.466.$$

The cosine similarity of "Good evening+It is snowing today" (which is set as a (0.3, 1.9)) and "this/evening/raining/It is" (which is set as c (0.3, 1.6)) is:

$$\cos\theta_2 = \frac{a \square c}{\|a\|\|c\|} = \frac{0.3 \times 0.3 + 1.9 \times 1.6}{\sqrt{0.3^2 + 1.9^2} + \sqrt{0.3^2 + 1.6^2}} = 0.881.$$

As can be seen from the above, the third sentence vector has a higher cosine similarity with the sentence vector of "this/evening/raining/It is", and the sentence vector of the sentence is the fourth sentence vector.

In the multi-round, the user's sentence "It is snowing today" (the previous sentence of which is "Good evening"), the "It is raining this evening" in the bottom corpus is matched, and then "It's raining this evening" is replied, the corresponding question and answer result is "Little master, it's getting late, and the weather is bad, please don't go out and run around. Peace of mind to sleep, and go play tomorrow", which may use some of the above information to make the whole reply smarter and more humanization.

S205: obtaining, according to the first sentence vector of the first query statement and from the bottom corpus, a second question and answer result corresponding to a sixth sentence vector a similarity between which and the first sentence vector similarity satisfies the preset condition, and returning the second question and answer result.

If the first query statement is the first query statement in the preset time period, the second question and answer result may be obtained from the bottom corpus directly according to the first sentence vector of the first query statement.

The voice interaction method and device includes determining whether a first query statement currently received is a query statement first received within a preset time period; if not, obtaining a second query statement, where the second query statement is a query statement lastly received before receiving the first query statement; and obtaining a third sentence vector according to a first sentence vector of the first query statement and a second sentence vector of the second query statement. In the embodiment, the sentence vector is obtained by combining the previous query statement, which fully considers the user's conversation scene, so that the question and answer result can consider context information. The method further includes obtaining, from a bottom corpus, a first question and answer result corresponding to a fourth sentence vector a similarity between which and the third sentence vector satisfies a preset condition, and returning the first question and answer result, so that a calculation process is simple, and the question and answer result can be obtained quickly and accurately.

Figure 3:
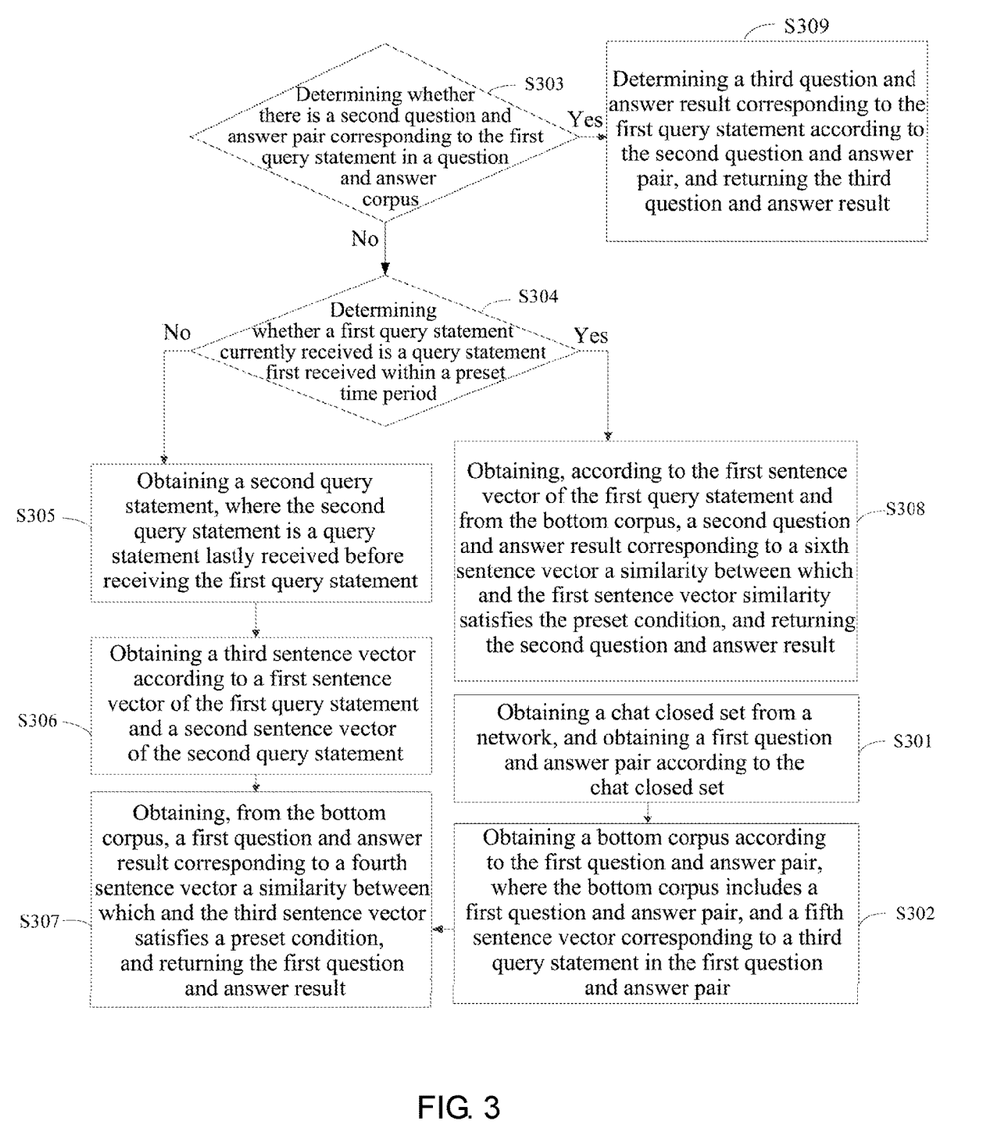
FIG. 3 is a second schematic flowchart of a voice interaction method according to an embodiment of the present disclosure.

FIG. 3 is a second schematic flowchart of a voice interaction method according to an embodiment of the present disclosure. The specific implementation process of this embodiment is described in detail based on the embodiment of FIG. 2. As shown in FIG. 3, the method includes:

S301: obtaining a chat closed set from a network, and obtaining a first question and answer pair according to the chat closed set;

S302: obtaining a bottom corpus according to the first question and answer pair, where the bottom corpus includes a first question and answer pair, and a fifth sentence vector corresponding to a third query statement in the first question and answer pair.

In the specific implementation process, the chat closed set may be obtained from the network, where the chat closed set refers to a limited number of chat conversation contents. The first question and answer pair may be extracted from the chat conversation contents, that is, a question and answer pair including a query statement and a question and answer result, and a sentence vector of each inquiry sentence is calculated, so as to obtain the bottom corpus.

S303: determining whether there is a second question and answer pair corresponding to the first query statement in a question and answer corpus, if not, performing S304, and if yes, performing S309;

S304: determining whether a first query statement currently received is a query statement first received within a preset time period; if not, performing S305, if not, performing S308;

After the first query is obtained, the second question and answer pair corresponding to the first query statement may be obtained from the question and answer corpus. The specific obtaining manner may be semantic matching, or the like, which is not particularly limited in this present embodiment. If there is the second question and answer pair, a third question and answer result corresponding to the first query statement is directly determined according to the second question and answer pair, and the third question and answer result is returned.

If there is no second question and answer pair, then S305 is performed. S305 to S308 are similar to S202 to S205 in the embodiment of FIG. 2, which is not particularly limited in this present embodiment.

S305: obtaining a second query statement, where the second query statement is a query statement lastly received before receiving the first query statement;

S306: obtaining a third sentence vector according to a first sentence vector of the first query statement and a second sentence vector of the second query statement;

S307: obtaining, from the bottom corpus, a first question and answer result corresponding to a fourth sentence vector a similarity between which and the third sentence vector satisfies a preset condition, and returning the first question and answer result;

S308: obtaining, according to the first sentence vector of the first query statement and from the bottom corpus, a second question and answer result corresponding to a sixth sentence vector a similarity between which and the first sentence vector similarity satisfies the preset condition, and returning the second question and answer result;

S309: determining the third question and answer result corresponding to the first query statement according to the second question and answer pair, and returning the third question and answer result.

The voice interaction method provided in this embodiment, by establishing the bottom corpus in advance, and obtains a matching question and answer result from the bottom corpus according to the similarity of the sentence vectors when there is no corresponding question and answer result in the question and answer corpus, simplifies the calculation process and can obtain the question and answer result quickly and accurately.

Figure 4:
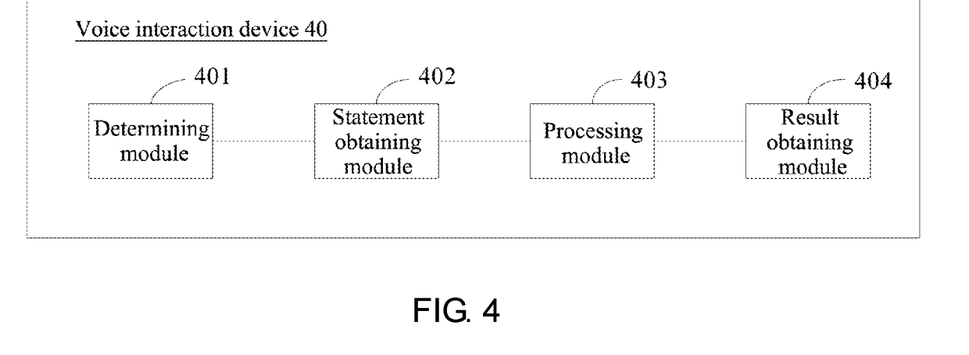
FIG. 4 is a first schematic structural diagram of a voice interaction device according to an embodiment of the present disclosure.

FIG. 4 is a first schematic structural diagram of a voice interaction device according to an embodiment of the present disclosure. As shown in FIG. 4, the voice interaction device 40 includes a determination module 401, a statement obtaining module 402, a processing module 403, and a result obtaining module 404.

The determining module 401 is configured to determine whether a first query statement currently received is a query statement first received within a preset time period;

the statement obtaining module 402 is configured to: when a determining result of the determining module 401 is no, obtain a second query statement, where the second query statement is a query statement lastly received before receiving the first query statement;

the processing module 403 is configured to obtain a third sentence vector according to a first sentence vector of the first query statement and a second sentence vector of the second query statement;

the result obtaining module 404 is configured to obtain, from a bottom corpus, a first question and answer result corresponding to a fourth sentence vector a similarity between which and the third sentence vector satisfies a preset condition, and return the first question and answer result.

The device provided in this embodiment may be used to perform the technical solution of the foregoing method embodiment, and the implementation principle and the technical effect are similar, which are not repeat in this embodiment.

Figure 5:
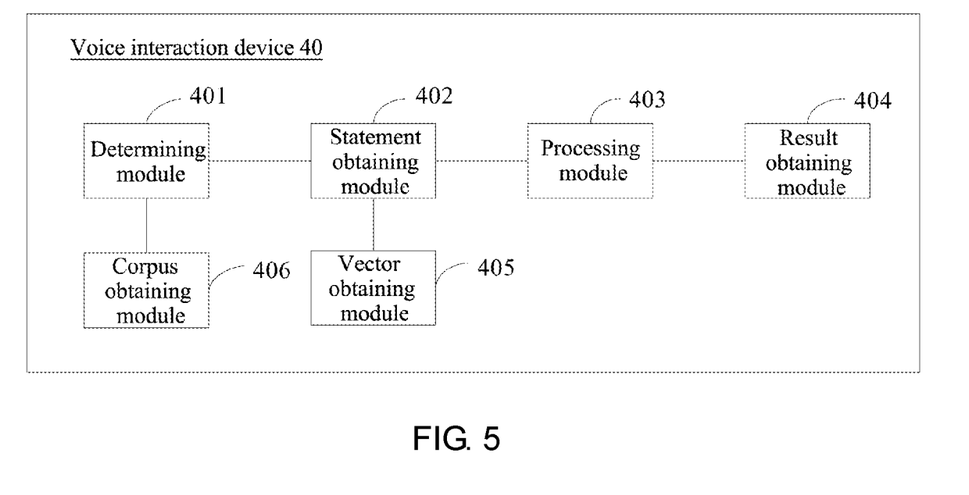
FIG. 5 is a second schematic structural diagram of a voice interaction device according to an embodiment of the present disclosure.

FIG. 5 is a second schematic structural diagram of a voice interaction device according to an embodiment of the present disclosure. As shown in FIG. 5, the embodiment, on the basis of the embodiment of FIG. 4, further includes a vector obtaining module 405 and a corpus obtaining module 406.

In a possible design, the processing module 403 is specifically configured to:

perform an addition process on the first sentence vector of the first query statement and the second sentence vector of the second query statement to obtain the third sentence vector.

In a possible design, the vector obtaining module 405 is further configured to: before the third sentence vector is obtained according to the first sentence vector of the first query statement and the second sentence vector of the second query statement, perform a word segmentation process on the first query statement to obtain a plurality of first words, and perform a word segmentation process on the second query statement to obtain a plurality of second words;

obtain the first sentence vector of the first query statement according to word vectors of the plurality of first words, and obtain the second sentence vector of the second query statement according to word vectors of the plurality of second words.

In one possible design, the result obtaining module 404 is specifically configured to:

obtain a similarity between each fifth sentence vector in the bottom corpus and the third sentence vector, where the bottom corpus includes a first question and answer pair, and a fifth sentence vector corresponding to a third query statement in the first question and answer pair;

take the fifth sentence vector having a highest similarity with the third sentence vector as the fourth sentence vector; and obtain, from the bottom corpus, the first question and answer result corresponding to the fourth sentence vector.

In a possible design, the result obtaining module 404 is further specifically configured to:

obtain a cosine similarity between each fifth sentence vector in the bottom corpus and the third sentence vector.

In a possible design, the corpus obtaining module 406 is configured to: before the similarity between each fifth sentence vector in the bottom corpus and the third sentence vector is obtained, obtain a chat closed set from a network, and obtain the first question and answer pair according to the chat closed set; and obtain the bottom corpus according to the first question and answer pair.

In a possible design, the determining module 401 is further configured to: before whether the first query statement currently received is the query statement first received within the preset time period is determined, determine whether there is a second question and answer pair corresponding to the first query statement in a question and answer corpus, and an obtained determining result is no.

In a possible design, the result obtaining module 404 is further configured to: if the first query statement is the query statement first received within the preset time period, obtain, according to the first sentence vector of the first query statement and from the bottom corpus, a second question and answer result corresponding to a sixth sentence vector a similarity between which and the first sentence vector similarity satisfies the preset condition, and return the second question and answer result.

The device provided in this embodiment may be used to perform the technical solution of the foregoing method embodiment, and the implementation principle and the technical effect are similar, which are not repeat in this embodiment.

Figure 6:
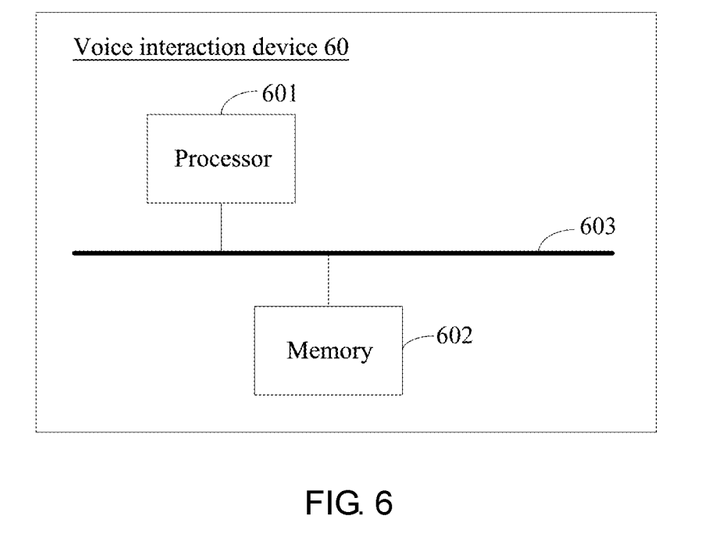
FIG. 6 is a schematic structural diagram of hardware of a voice interaction device according to an embodiment of the present disclosure.

FIG. 6 is a schematic structural diagram of hardware of a voice interaction device according to an embodiment of the present disclosure. As shown in FIG. 6, the voice interaction device 60 of the embodiment includes: a processor 601 and a memory 602; where the memory 602 is configured to store a computer-executed instruction;

the processor 601 is configured to execute the computer-executed instruction stored by the memory storage to implement the various steps performed by the voice interaction device in the above embodiment. For details, reference may be made to the related description in the foregoing method embodiments.

Alternatively, the memory 602 may be either standalone or integrated with the processor 601.

When the memory 602 is independently set, the voice interaction device further includes a bus 1703 for connecting the memory 1702 and the processor 1701.

The embodiment of the present disclosure further provides a computer readable storage medium, where the computer readable storage medium stores a computer-executed instruction therein, and when a processor executes the computer-executed instruction, the processor implements the voice interaction method as described above.

In the several embodiments provided by the present disclosure, it should be understood that the disclosed device and method may be implemented in other manners. For example, the device embodiments described above are merely illustrative. For example, the division of the modules is only a division of logical functions. In actual implementation, there may be another division manner, for example, multiple modules may be combined or integrated into another system, or some features may be ignored or not implemented. Moreover, the coupling, direct coupling or communication connection shown or discussed may be an indirect coupling or communication connection through some interfaces, apparatuses or modules, and may be in electrical, mechanical or other form.

The modules described as separate components may or may not be physically separated, and the components illustrated as modules may or may not be physical units, that is, may be located in one place, or may be distributed to multiple network units. Some or all of the modules may be selected according to actual needs to achieve the objectives of the solution of the embodiment.

In addition, each functional module in each embodiment of the present disclosure may be integrated into one processing unit, or each module may exist physically separately, or two or more modules may be integrated into one unit. The above integrated units may be implemented in the form of hardware or in the form of hardware plus software functional units.

The above-described integrated units implemented in the form of a software functional unit may be stored in a computer readable storage medium. The above software functional unit is stored in a storage medium and includes several instructions for causing a computer device (which may be a personal computer, a server, or a network device and the like) or a processor to perform part of the steps in the methods of the various embodiments of the present application.

It should be understood that the above processor may be a central processing unit (Central Processing Unit, CPU for short), or may be other general-purpose processors, digital signal processors (Digital Signal Processors, DSPs for short), application specific integrated circuits (Application Specific Integrated Circuits, ASIC for short), or the like. The general purpose processor may be a microprocessor, or the processor or any conventional processor, or the like. The steps of the method disclosed in connection with the present disclosure may be directly embodied as executed by the hardware processor or by a combination of hardware and software modules in the processor.

The memory may include high speed RAM memory, and may also include non-volatile memory NVM, such as at least one disk storage, and may also be a USB flash disk, a removable hard disk, a read only memory, a magnetic disk, or an optical disk, or the like.

The bus may be an industry standard architecture (Industry Standard Architecture, ISA) bus, a peripheral component (Peripheral Component, PCI) bus, or an extended industry standard architecture (Extended Industry Standard Architecture, EISA) bus. The bus may be divided into an address bus, a data bus, a control bus, or the like. For ease of representation, the bus in the drawings of the present application is not limited to only one bus or one type of bus.

The above storage medium may be implemented by any type of volatile or non-volatile storage device or a combination thereof, such as Static Random Access Memory (SRAM), Electrically Erasable Programmable Read Only Memory (EEPROM), Erasable Programmable Read Only Memory (EPROM), Programmable Read Only Memory (PROM), Read Only Memory (ROM), magnetic memory, flash memory, magnetic disk or optical disk. The storage medium may be any available medium that can be accessed by a general purpose or special purpose computer.

An exemplary storage medium is coupled to the processor to enable the processor to read information from the storage medium, and write information into the storage medium. Of course, the storage medium may also be a component of the processor. The processor and the storage medium may be located in an Application Specific Integrated Circuits (ASIC). Of course, the processor and the storage medium may also exist as discrete components in an electronic device or a master device.

It will be understood by those skilled in the art that all or part of the steps for implementing the above method embodiments may be performed by program instruction relevant hardware. The aforementioned program may be stored in a computer readable storage medium. The program, when executed, performs the steps including the foregoing method embodiments; while the foregoing storage medium includes various medium that can store a program code, such as a ROM, a RAM, a magnetic disk, or an optical disk, or the like.

Finally, it should be noted that the foregoing embodiments are merely intended for describing, rather than limiting, the technical solutions of the present disclosure. Although the present disclosure is described in detail with reference to the foregoing embodiments, those skilled in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present disclosure.

What is claimed is:

1. A voice interaction method, comprising:
   determining whether a first query statement currently received is a query statement first received within a preset time period;
   if not, obtaining a second query statement, wherein the second query statement is a last query statement received before receiving the first query statement;
   obtaining a third sentence vector according to a first sentence vector of the first query statement and a second sentence vector of the second query statement; and
   obtaining, from a bottom corpus, a first question and answer result corresponding to a fourth sentence vector, wherein a similarity between the fourth sentence vector and the third sentence vector satisfies a preset condition, and returning the first question and answer result.

2. The method according to claim 1, wherein the obtaining the third sentence vector according to the first sentence vector of the first query statement and the second sentence vector of the second query statement comprises:
   performing an addition process on the first sentence vector of the first query statement and the second sentence vector of the second query statement to obtain the third sentence vector.

3. The method according to claim 1, wherein before the obtaining the third sentence vector according to the first sentence vector of the first query statement and the second sentence vector of the second query statement, the method further comprises:
   performing a word segmentation process on the first query statement to obtain a plurality of first words, and performing a word segmentation process on the second query statement to obtain a plurality of second words.

4. The method according to claim 3, wherein after the performing the word segmentation process on the first query statement to obtain the plurality of first words, and performing the word segmentation process on the second query statement to obtain the plurality of second words, the method further comprises:
   obtaining the first sentence vector of the first query statement according to word vectors of the plurality of first words, and obtaining the second sentence vector of the second query statement according to word vectors of the plurality of second words.

5. The method according to claim 1, wherein the obtaining, from the bottom corpus, the first question and answer result corresponding to the fourth sentence vector the similarity between which and the third sentence vector satisfies the preset condition comprises:
   obtaining a similarity between each fifth sentence vector in the bottom corpus and the third sentence vector, wherein the bottom corpus comprises a first question and answer pair, and a fifth sentence vector corresponding to a third query statement in the first question and answer pair;
   taking the fifth sentence vector having a highest similarity with the third sentence vector as the fourth sentence vector; and
   obtaining, from the bottom corpus, the first question and answer result corresponding to the fourth sentence vector.

6. The method according to claim 5, wherein the obtaining the similarity between each fifth sentence vector in the bottom corpus and the third sentence vector comprises:
   obtaining a cosine similarity between each fifth sentence vector in the bottom corpus and the third sentence vector.

7. The method according to claim 5, wherein before the obtaining the similarity between each fifth sentence vector in the bottom corpus and the third sentence vector, the method further comprises:
   obtaining a chat closed set from a network, and obtaining the first question and answer pair according to the chat closed set.

8. The method according to claim 7, wherein after the obtaining the chat closed set from the network, and obtaining the first question and answer pair according to the chat closed set, the method further comprises:
   obtaining the bottom corpus according to the first question and answer pair.

9. The method according to claim 1, wherein before the determining whether the first query statement currently received is the query statement first received within the preset time period, the method further comprises:

determining whether there is a second question and answer pair corresponding to the first query statement in a question and answer corpus, and an obtained determining result is no.

10. The method according to claim 1, wherein if the first query statement is the query statement first received within the preset time period, the method further comprises:
obtaining, according to the first sentence vector of the first query statement and from the bottom corpus, a second question and answer result corresponding to a sixth sentence vector a similarity between which and the first sentence vector similarity satisfies the preset condition, and returning the second question and answer result.

11. A voice interaction device, comprising:
a memory, a processor, and a computer program stored on the memory and operable on the processor,
wherein the processor, when running the computer program, is configured to:
determine whether a first query statement currently received is a query statement first received within a preset time period;
when a determining result is no, obtain a second query statement, wherein the second query statement is a last query statement received before receiving the first query statement;
obtain a third sentence vector according to a first sentence vector of the first query statement and a second sentence vector of the second query statement; and
obtain, from a bottom corpus, a first question and answer result corresponding to a fourth sentence vector, wherein a similarity between the fourth sentence vector and the third sentence vector satisfies a preset condition, and return the first question and answer result.

12. The device according to claim 11, wherein the processor is configured to:
perform an addition process on the first sentence vector of the first query statement and the second sentence vector of the second query statement to obtain the third sentence vector.

13. The device according to claim 11, wherein the processor is further configured to:
before the third sentence vector is obtained according to the first sentence vector of the first query statement and the second sentence vector of the second query statement, perform a word segmentation process on the first query statement to obtain a plurality of first words, and perform a word segmentation process on the second query statement to obtain a plurality of second words;
obtain the first sentence vector of the first query statement according to word vectors of the plurality of first words, and obtain the second sentence vector of the second query statement according to word vectors of the plurality of second words.

14. The device according to claim 11, wherein the processor is configured to:
obtain a similarity between each fifth sentence vector in the bottom corpus and the third sentence vector, wherein the bottom corpus comprises a first question and answer pair, and a fifth sentence vector corresponding to a third query statement in the first question and answer pair;

take the fifth sentence vector having a highest similarity with the third sentence vector as the fourth sentence vector; and
obtain, from the bottom corpus, the first question and answer result corresponding to the fourth sentence vector.

15. The device according to claim 14, wherein the processor is further configured to:
obtain a cosine similarity between each fifth sentence vector in the bottom corpus and the third sentence vector.

16. The device of claim 14, wherein the processor is further configured to:
before the similarity between each fifth sentence vector in the bottom corpus and the third sentence vector is obtained, obtain a chat closed set from a network, and obtain the first question and answer pair according to the chat closed set.

17. The device of claim 16, wherein the processor is further configured to:
obtain the bottom corpus according to the first question and answer pair.

18. The device according to claim 11, wherein the processor is further configured to: before whether the first query statement currently received is the query statement first received within the preset time period is determined, determine whether there is a second question and answer pair corresponding to the first query statement in a question and answer corpus, and an obtained determining result is no.

19. The device according to claim 11, wherein the processor is further configured to: if the first query statement is the query statement first received within the preset time period, obtain, according to the first sentence vector of the first query statement and from the bottom corpus, a second question and answer result corresponding to a sixth sentence vector a similarity between which and the first sentence vector similarity satisfies the preset condition, and return the second question and answer result.

20. A computer readable storage medium, wherein the computer readable storage medium stores a computer-executed instruction therein, and when a processor executes the computer-executed instruction, the processor is configured to:
determine whether a first query statement currently received is a query statement first received within a preset time period;
if not, obtain a second query statement, wherein the second query statement is a last query statement received before receiving the first query statement;
obtain a third sentence vector according to a first sentence vector of the first query statement and a second sentence vector of the second query statement; and
obtain, from a bottom corpus, a first question and answer result corresponding to a fourth sentence vector, wherein a similarity between the fourth sentence vector and the third sentence vector satisfies a preset condition, and return the first question and answer result.

* * * * *